United States Patent Office 3,317,685
Patented May 2, 1967

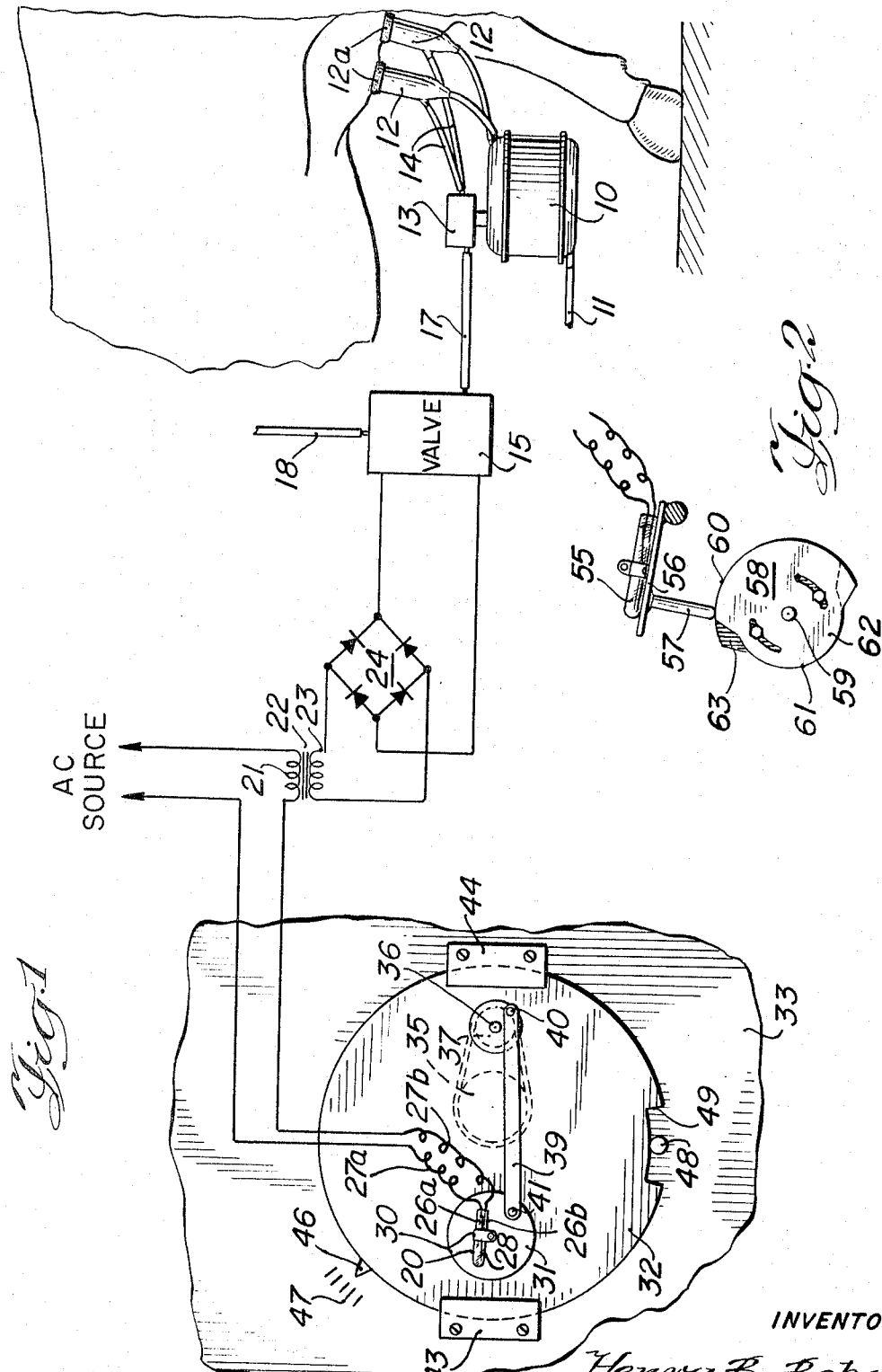

3,317,685
PULSATOR TIMER
Henry B. Babson, Chicago, Ill., assignor to Babson Bros. Co., a corporation of Illinois
Filed Oct. 12, 1964, Ser. No. 403,065
2 Claims. (Cl. 200—19)

This application is concerned with an electric timer for the pulsator of a vacuum milking system.

In a vacuum milking system milk is carried away from the cow's teats under a reduced pressure or vacuum. It is necessary, for efficient milking operation, to provide periodic rest or massage for the animal's teats to prevent physical injury to the teats and to facilitate the flow of milk within the cow's udder. A modern milking system commonly includes teat cups which are applied to the cow's teats and which have a flexible liner or inflation in which the teat is received. The interior of the inflation is maintained under continuous vacuum while the space between the inflation and a rigid outer shell is alternately evacuated and filled with air at atmospheric pressure. When the shell is evacuated the inflations are expanded and milk flows through the inflation to a suitable receiver. When the shell is filled with air, the inflation collapses about the teat closing off the milk passage, massaging the teat and providing a rest period. In a representative milking operation, the pulsator operates at a rate of fifty-five cycles per minute with equal periods of vacuum and air.

The timing of the application of vacuum and air to the inflations affects the efficiency of the milking operation. This timing has commonly been done by a vacuum operated valve or pulsator or by an electric timer utilizing fixed period cams. The vacuum pulsator, while relatively easy to adjust, is often erratic in operation due to dirt or the like, for example. The relative periods of vacuum and air are difficult to adjust with a cam timer.

The pulsator-timer disclosed herein utilizes a mercury switch which may be opened and closed repeatedly without contact deterioration and which, in one form of the invention, is particularly adapted for varying the ratio of the operating periods of the timer.

One feature of the invention is the provision of drive means including a timing motor and having an output shaft with means connected between the shaft and the mercury switch for alternately opening and closing the switch, which is connected in the pulsator control circuit for the milker. A further feature is that means are provided for adjusting the ratio of switch open and closed time.

Another feature of the invention is that the drive means rocks the mercury switch about a center position, and that the center position of the switch is adjustable with respect to the horizontal, adjusting the ratio of the operating periods of the switch.

More specifically, the switch is mounted on a pivoted carrier which is rocked by a crank. The pivoted support is mounted on a carrier which is angularly adjustable in position on a base member.

In a modified form of the invention, a mercury switch is mounted on a pivoted support with a cam follower connected to the support and engaging a cam having a surface with two portions adjustable with respect to each other, to vary the ratio of switch operating periods.

Further features and advantages of the invention will readily be apparent from the following specification and drawings, in which:

FIGURE 1 is a diagrammatic view illustrating one form of the invention; and

FIGURE 2 is a fragmentary diagrammatic view illustrating a modified switch actuator construction.

The invention is disclosed herein in a pulsator-timer utilized as a part of a carry-away milking system and in which an electrically operated valve is connected with the teat cups through a manifold mounted on the milking apparatus. It will be understood that the invention is not limited to this specific milking system but may be used with suspended bucket milkers, for example, or that the electrical signal from the timer may actuate a pneumatic control valve which in turn operates a pulsator.

In FIGURE 1 a portion of a carry-away milking system is illustrated including a milk receiving chamber 10 having an outlet in the bottom connected by a milk hose 11 with an evacuated carry-away milk pipeline (not shown). Teat cups 12 are shown applied to the teats of a cow and have flexible inflations 12a therein connected with nipples on the lid of chamber 10. A pulsator manifold 13, mounted on the lid of chamber 10, is connected through air hoses 14 with the shells of the teat cups. An electrically operated control or pulsator valve 15 is connected through a hose 17 with pulsator manifold 13 and provides a pneumatic control, as vacuum and air, which determines whether the shells of the teat cups are evacuated or vented to air. Control valve 15 is connected through hose 18 with a suitable source of vacuum (not shown).

Pulsator valve 15 is actuated by a timing circuit which includes a mercury control switch 20. In the specific embodiment of the invention illustrated, the switch 20 is connected in series with the primary winding 21 of a step-down transformer 22, across a suitable source of electrical power, as 110 volts A.C. The secondary winding 23 of the step-down transformer is connected with a full wave rectifier 24, the output of which is utilized to energize control valve 15. When switch 20 is closed, valve 15 is energized connecting manifold 13 with the source of vacuum and, in turn, evacuating the interiors of the teat cup shells. When switch 20 is open, valve 15 is not energized and the interior of the teat cup shells are vented to air.

Mercury switch 20 includes a closed chamber which may be of glass, for example, and which has a pair of electrodes 26a and 26b therein, connected through flexible leads 27a and 27b with the electrical circuit. A quantity 28 of mercury within the chamber 20 bridges contacts 26a and 26b when the position of the switch, relative to the horizontal, is such that the mercury flows around the contacts. The pulsator timing action is provided by rocking the mercury switch, as will appear. Flexible leads 27a and 27b are selected for their ability to withstand repeated flexing. For example, they may be lengths of rubber tubing filled with powdered graphite.

The switch 20 is secured by a strap 30 to a rockable support 31 pivotally mounted on a carrier 32 which, in turn, is mounted for angular adjustment on a base 33. A timer-drive motor 35 is secured to the rear surface of adjustable carrier 32 and may include a suitable speed reducing gearing means (not shown) which has an output shaft 36 extending through the carrier plate 32. A drive disc 37 mounted on shaft 36 has a link 39 pivotally connected adjacent the periphery thereof by a pin 40. The other end of link 39 is connected by a pin 41 with switch support 31. Drive disc 37 and link 39 form a crank drive which rocks switch carrier 31 through a limited arc, about a center position. The relationship of the center position of the rocking movement of switch carrier 31 to the angular position in which mercury switch 28 opens and closes determines the ratio of the operating periods of the pulsator. If the center position of the rocking movement of support 31 corresponds with the position of switch actuation, the switch will be closed for half of the cycle and open for half of the cycle. The ratio of the active to rest portions of the cycle may readily be changed by adjusting the position of switch actuation with relation to the center position of the rocking motion of the mercury switch. The carrier 32 on which the support 31 is mounted is angularly adjustable on base 33 and is secured in a desired position by clamping plate 43 and 44. The clamping plates may be loosened and the position of carrier plate 32 adjusted to change the point in the rocking cycle of the switch support at which the switch opens and closes. Thus, the active cycle of the milking apparatus can be made longer or shorter than the rest period, in accordance with the requirements of the particular cows being milked.

A pointer 46 on the carrier 32 cooperates with a scale or indicia 47 on base plate 33 to indicate the timing for which the switch is adjusted. A fixed pin 48 extends outwardly from the base into a slot 49 in carrier 32, limiting the range of movement of the carrier. It would be useless, for example, to adjust the position of the carrier to an angle where the switch is always open or always closed.

Another from of the invention is illustrated in FIGURE 2. Here, mercury switch 55 is mounted on a pivoted carrier 56 from which extends a cam follower 57 that rests on the periphery of a cam 58 carried by drive shaft 59. One portion of the cam has a periphery 60 of a radius larger than the other portion of the periphery 61. When the cam follower engages the periphery portion 60, switch 55 is held in the closed position, as shown. As the cam rotates and the follower moves to periphery portion 61, the angular position of switch 55 is changed and the switch opens.

Cam 58 is made up of two portions 62 and 63 each of which provides a part of the operating surface 60, 61. The two cam portions are adjustable with respect to each other so that the length of cam portion 60 may, within limits, be changed. This, again, provides an adjustable pulsator action for the milking system.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. A timer for the pulsator of a vacuum milking system, comprising: a base member; a circular carrier mounted on said base member for movement through a range of angular positions with respect to said base; releasable clamp means for locking said carrier against movement with respect to said base; means including a timing motor and having an output shaft, said timing motor being mounted on said carrier; a pulsator control circuit; a mercury switch connected in series in said control circuit; a pivoted support for said mercury switch, mounted on said carrier; and crank means including a drive link connected between the output shaft of said drive means and said switch support, to rock said support about a center position, said mercury switch having an open position and a closed position within its range of rocking and throughout the range of positions of said carrier, the angular movement of said carrier with respect to said base varying the ratio of switch open to switch closed time.

2. A timer for the pulsator of a vacuum milking system, comprising: a base member; a carrier mounted on said base member for movement through a range of angular positions with respect to said base; releasable means for locking said carrier against movement with respect to said base; means including a timing motor and having an output shaft mounted on said carrier; a pulsator control circuit; a mercury switch connected in series in said control circuit; a pivoted support for said mercury switch, mounted on said carrier; and crank means including a drive link connected between the output shaft of said drive means and said switch support, to rock said support about a center position, said mercury switch having an open position and a closed position within its range of rocking and throughout the range of positions of said carrier, the angular movement of said carrier with respect to said base varying the ratio of switch open to switch closed time, wherein stop means are provided between said carrier and said base to limit the range of adjustment of said carrier, together with indicia indicating the relative operating ratio of said switch.

References Cited by the Examiner
UNITED STATES PATENTS

| | | | |
|---|---|---|---|
| 2,585,607 | 2/1952 | Whitmore et al. | 318—443 X |
| 2,614,239 | 10/1952 | Smith et al. | 318—443 |
| 2,981,854 | 4/1961 | Grace et al. | 307—132 |

FOREIGN PATENTS 753,508  7/1956  Great Britain.

ORIS L. RADER, *Primary Examiner.*

B. A. COOPER, *Assistant Examiner.*